United States Patent
Sakai

(10) Patent No.: US 11,738,566 B2
(45) Date of Patent: Aug. 29, 2023

(54) PRINTING PROGRAM AND PRODUCING METHOD FOR PRINT

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 73 days.

(21) Appl. No.: 17/323,025

(22) Filed: May 18, 2021

(65) Prior Publication Data

US 2021/0362510 A1 Nov. 25, 2021

(30) Foreign Application Priority Data

May 20, 2020 (JP) ................................. 2020-088348

(51) Int. Cl.
*B41J 3/36* (2006.01)
*B41J 2/21* (2006.01)

(52) U.S. Cl.
CPC .............. *B41J 2/2142* (2013.01); *B41J 3/36* (2013.01)

(58) Field of Classification Search
CPC ..................................... B41J 3/36; B41J 29/38
See application file for complete search history.

(56) References Cited

U.S. PATENT DOCUMENTS

| 2005/0140708 | A1* | 6/2005 | Barckhahn | B41J 11/008 |
| | | | | 347/9 |
| 2011/0109678 | A1* | 5/2011 | Schwartz | B41J 3/36 |
| | | | | 347/14 |
| 2018/0250947 | A1 | 9/2018 | Nakata et al. | |
| 2018/0354257 | A1 | 12/2018 | Watanabe et al. | |
| 2019/0389238 | A1 | 12/2019 | Nakamura et al. | |
| 2020/0079111 | A1* | 3/2020 | Shikama | H04N 1/00816 |
| 2020/0288033 | A1* | 9/2020 | Tokumaru | H04N 1/1918 |

FOREIGN PATENT DOCUMENTS

| JP | 2018-144338 A | 9/2018 |
| JP | 2019-217732 A | 12/2019 |
| JP | 2020-040278 A | 3/2020 |
| WO | WO-2021096524 A1 * | 5/2021 |

* cited by examiner

*Primary Examiner* — Scott A Richmond
(74) *Attorney, Agent, or Firm* — Global IP Counselors, LLP

(57) ABSTRACT

A producing method for a print by a printing system including a printing device that is manually moved with respect to a medium to perform printing on the medium, the producing method including the printing system determining whether a print plan size of a print image is a one-pass printable size, which is a size printable in one pass by the printing device, and, when it is determined that the print plan size is not the one-pass printable size, the printing device printing the print image in the one pass.

11 Claims, 20 Drawing Sheets

FIG. 3
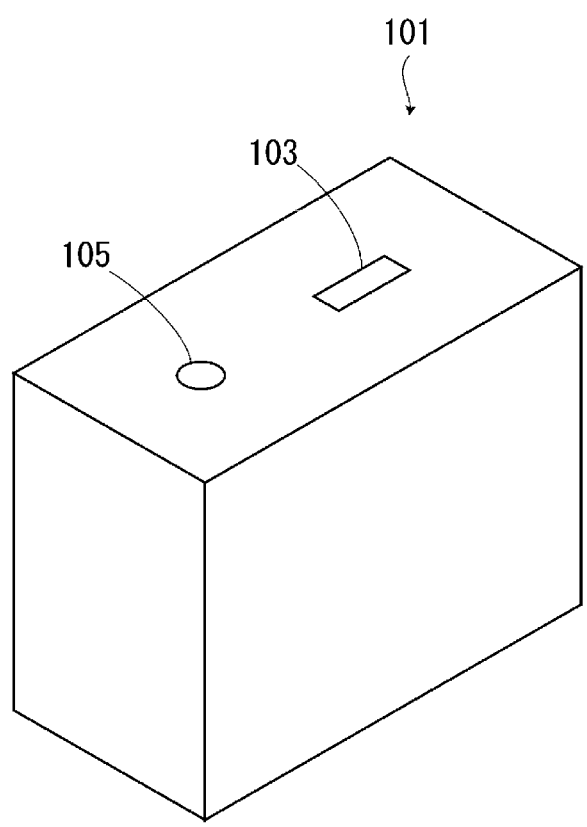
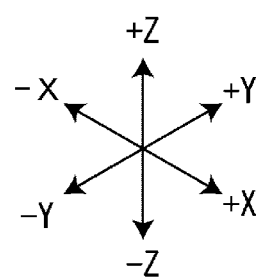

FIG. 4
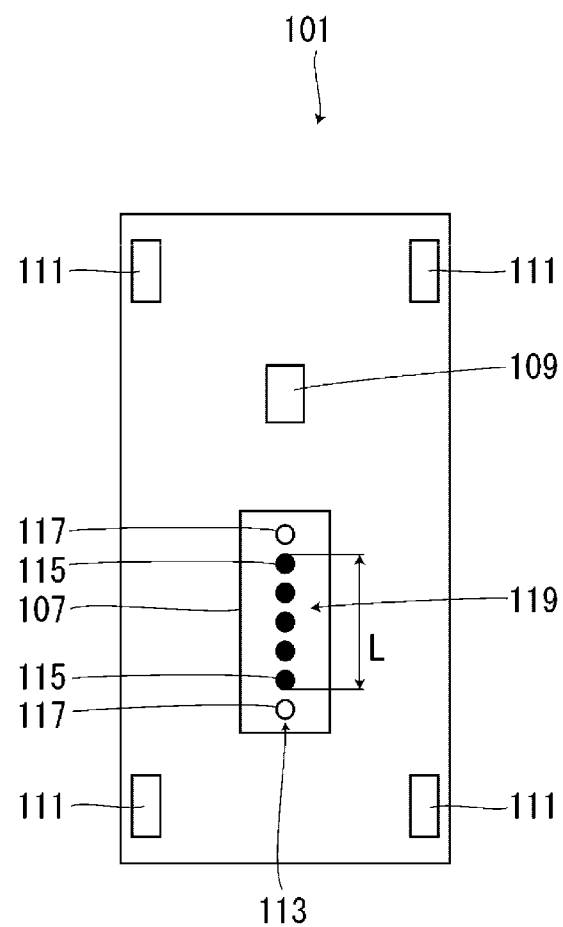
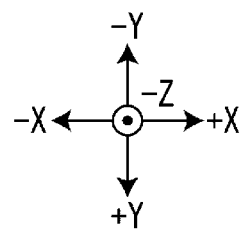

PRINTING PROGRAM AND PRODUCING METHOD FOR PRINT

The present application is based on, and claims priority from JP Application Serial Number 2020-088348, filed May 20, 2020, the disclosure of which is hereby incorporated by reference herein in its entirety.

BACKGROUND

1. Technical Field

The present disclosure relates to a printing program and a producing method for a print.

2. Related Art

As disclosed in JP-A-2018-144338 (Patent Literature 1), there has been known a handy mobile printer that is manually moved with respect to a medium to perform printing on the medium. When a print image to be printed is larger than a size printable in one pass, the handy mobile printer prints the print image separately in a plurality of passes.

When the print image is printed separately in the plurality of passes by the handy mobile printer, it is likely that streaks occur on the print image because a plurality of partial images printed in the plurality of passes overlap one another or gaps are formed among the plurality of partial images.

SUMMARY

A non-transitory computer-readable storage medium according to an aspect of the present disclosure stores a printing program that causes a computer to realize: a determining function for determining whether a print plan size of a print image is a one-pass printable size, which is a size printable in one pass by a printing device that is manually moved with respect to a medium to perform printing on the medium; and an instructing function for, when it is determined that the print plan size is not the one-pass printable size, performing a one-pass printing instruction for instructing the printing device to print the print image in the one pass.

A non-transitory computer-readable storage medium according to an aspect of the present disclosure stores a printing program that causes a computer to realize: a controlling function for controlling a printing device, which is manually moved with respect to a medium to perform printing on the medium, to print a print image on the medium; a limitation receiving function for receiving, from a user, an instruction for limiting a print plan size of the print image to a one-pass printable size, which is a size printable in one pass by the printing device; and a limiting function for, when the limitation receiving function receives the instruction, limiting the print plan size to be the one-pass printable size.

A producing method for producing a print according to an aspect of the present disclosure is a producing method for producing a print by a printing system including a printing device that is manually moved with respect to a medium to perform printing on the medium, the producing method including: causing the printing system to determine whether a print plan size of a print image is a one-pass printable size, which is a size printable in one pass by the printing device; and, when it is determined that the print plan size is not the one-pass printable size, causing the printing system to change the print plan size to the one-pass printable size; and causing the printing device to print the print image in the changed print plan size.

A producing method for producing a print according to an aspect of the present disclosure is a producing method for producing a print on which a print image is printed by manually moving a printing device with respect to a medium to, the producing method including: causing a printing system including the printing device to receive, from a user, an instruction for limiting a print plan size of the print image to a one-pass printable size, which is a size printable in one pass by the printing device; in a first case in which the printing system receives the instruction, causing the printing system to limit the print plan size of the print image to the one-pass printable size and then causing the printing device to perform printing and producing the print; and, in a second case in which the printing system does not receive the instruction, causing the printing system to set the print plan size of the print image to a size larger than the one-pass printable size, and making the printing device perform printing in the size to produce the print.

BRIEF DESCRIPTION OF THE DRAWINGS

FIG. 3 is a perspective view of the printing device.

FIG. 4 is a diagram of the printing device viewed from a −Z direction.

DESCRIPTION OF EXEMPLARY EMBODIMENTS

Embodiments of a printing device and a producing method for a print are explained below with reference to the accompanying drawings. In the following explanation, directions in an XYZ orthogonal coordinate system shown in the figures are used. These directions are only for convenience of explanation and do not limit the embodiments explained below.

Printing System

Figure 1:
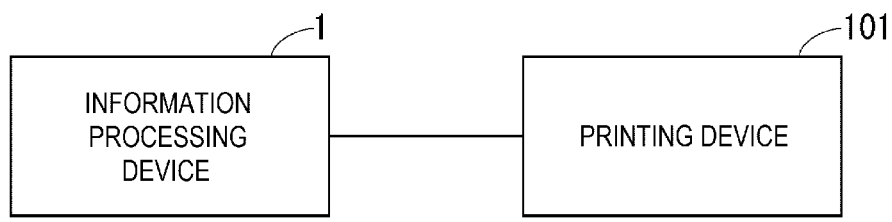
FIG. 1 is a block diagram showing a printing system.

As shown in FIG. 1, a printing system Sy includes an information processing device 1 and a printing device 101. The information processing device 1 and the printing device 101 are communicably connected by wire or radio.

The information processing device 1 transmits a printing job to the printing device 101. As the information processing device 1, for example, a smartphone, a table terminal, and a personal computer can be used.

Figure 2:
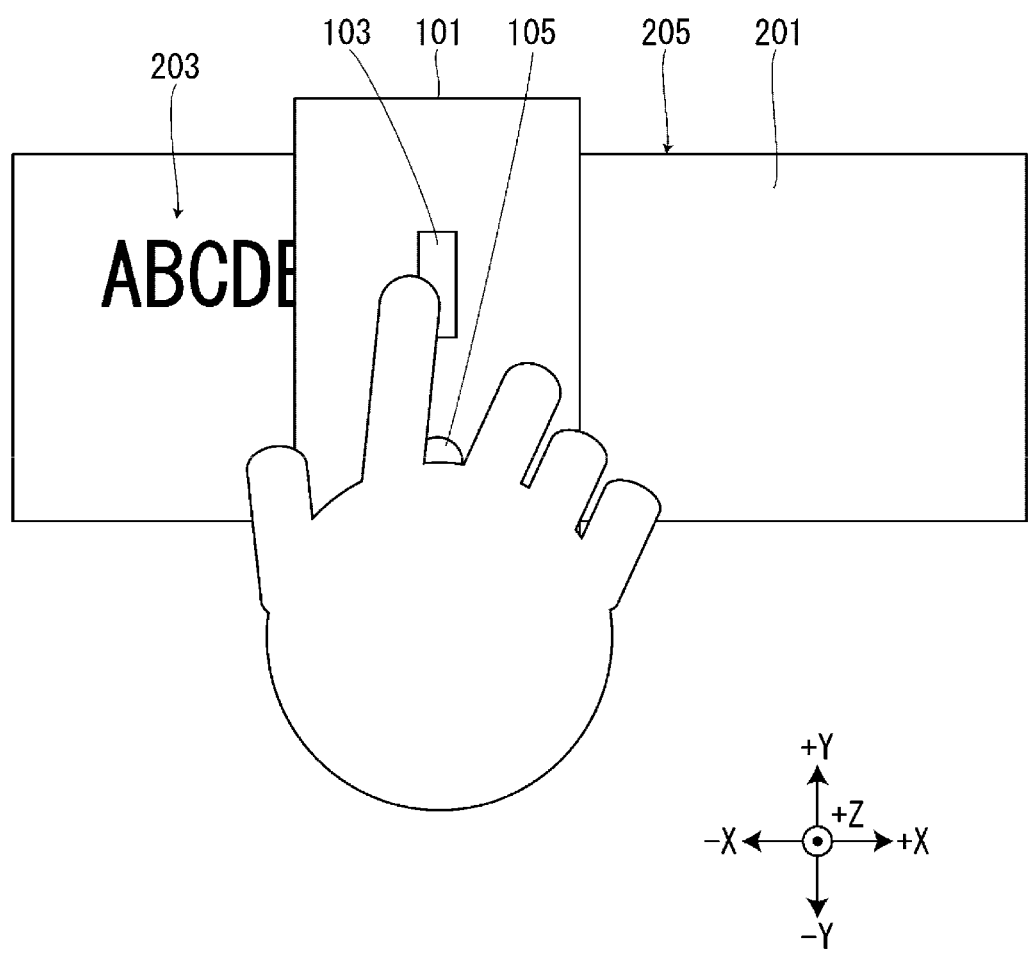
FIG. 2 is a diagram showing a print obtained by printing a print image on a medium with a printing device.

As shown in FIG. 2, the printing device 101 is a so-called handy printer. The printing device 101 is manually moved with respect to a medium 201 to print a print image 203 on the medium 201 based on the printing job received from the information processing device 1. That is, the printing device 101 produces a print 205 obtained by printing the print image 203 on the medium 201. The printing device 101 ejects, while being manually moved with respect to the medium 201, ink to the medium 201 in an inkjet scheme to print the print image 203 on the medium 201. The medium 201 is not limited to printing paper. For example, an envelope, a postcard, a business card, cardboard, a notebook, a CD (Compact Disc), and a wood slab can be used.

Printing Device

The printing device 101 is explained with reference to FIGS. 3 and 4. As shown in FIG. 3, the printing device 101 is formed in a substantially rectangular parallelepiped shape. A print button 103 and a power button 105 are provided on a surface in a +Z direction of the printing device 101. The print button 103 receives an instruction for a printing start from a user. The user can cause the printing device 101 to print the print image 203 by placing the printing device 101 on the medium 201, pressing the print button 103, and thereafter moving the gripped printing device 101 in a +X direction or a −X direction along the surface of the medium 201 (see FIG. 2). A printing operation performed while the printing device 101 is moved in the +X direction or the −X direction is referred to as "pass". The power button 105 receives an instruction for switching ON and OFF of a power supply from the user.

As shown in FIG. 4, a printing head 107, a movement measuring section 109, and a plurality of rollers 111 are provided on a surface on a −Z direction of the printing device 101.

The printing head 107 is an inkjet head including a plurality of nozzles 113. The printing head 107 ejects ink from the plurality of nozzles 113 to print the print image 203 on the medium 201. The plurality of nozzles 113 are arranged in one row or a plurality of rows in a Y direction.

The movement measuring section 109 optically measures movement of the printing device 101 moved on the medium 201 by the user. Measuring movement of the printing device 101 means measuring a moving direction and a moving distance of the printing device 101. As the movement measuring section 109, a section that includes a light source such as an LED (Light Emitting Diode) and an image sensor and measures movement with respect to the medium 201 from a change in an image of the medium 201 output by the image sensor can be used.

The plurality of rollers 111 rotate in slide contact with the medium 201 to guide the movement of the printing device 101 in the +X direction or the −X direction with respect to the medium 201.

When the printing device 101 is moved with respect to the medium 201 by the user, the printing device 101 calculates relative positions of the printing device 101 and the medium 201 based on a measurement result of the movement measuring section 109. The printing device 101 ejects ink from the plurality of nozzles 113 at timing corresponding to the relative positions based on the measurement result of the movement measuring section 109. Consequently, the printing device 101 can print an image in an appropriate position of the medium 201 irrespective of speed of the movement of the printing device 101 by the user.

If "n" nozzles 113 are provided in the printing head 107, among the "n" nozzles 113, (n-a-b) nozzles 113 provided in the middle portion in the Y direction are referred to as first nozzles 115 and "a" nozzles 113 provided at the end portion in a +Y direction and "b" nozzles 113 provided at the end portion in a −Y direction are referred to as second nozzles 117. A nozzle row configured from the (n-a-b) first nozzles 115 is referred to as first nozzle row 119. The length of the first nozzle row 119 is referred to as first nozzle row length L. In FIGS. 4 to 8, the first nozzles 115 are represented by black circles and the second nozzles 117 are represented by white circles. Numerical value ranges of "n", "a", and "b" are not particularly limited. However, for example, (n-a-b) is an integer equal to or larger than 300 and equal to or smaller than 1200, "a" is an integer equal to or larger than 5 and equal to or smaller than 30, and "b" is an integer equal to or larger than 5 and equal to or smaller than 30. The numbers "a" and "b" may be the same number or may be different numbers. In FIGS. 4 to 8, for simplification of illustration, n=7, a=1, and b=1. The printing head 107 may include only the first nozzles 115 and may not include the second nozzles 117. That is, both of "a" and "b" may be 0. In this case, the first nozzle row length L is the length of a nozzle row configured from all of the "n" nozzles 113 provided in the printing head 107.

When the printing device 101 does not deviate in the +Y direction or the −Y direction, the printing head 107 ejects ink from only the first nozzles 115 of the first nozzles 115 and the second nozzles 117. A maximum size in the Y direction of the print image 203 that can be printed in one pass is substantially equal to the first nozzle row length L. That is, the printing device 101 cannot print the print image 203, a size in the Y direction of which is larger than the first nozzle row length L, in one pass. However, since the user manually moves the printing device 101, the printing device 101 sometimes deviates in the +Y direction or the −Y direction. In this case, the print image 203, the size in the Y direction of which is substantially equal to the first nozzle row length L, cannot be printed by only the first nozzles 115. Accordingly, when the printing device 101 deviates in the +Y direction or the −Y direction while being moved in the +X direction or the −X direction, the second nozzles 117 are used to compensate for the deviation. However, in a certain pass, when the printing device 101 deviates in the +Y direction or the −Y direction while being moved in the +X direction or the −X direction, first, the printing device 101 performs printing by compensating for the deviation with the second nozzles 117. However, when the printing device 101 deviates in the +Y direction or the −Y direction exceeding a range of the second nozzles 117, the printing device 101 cannot print the entire print image 203 in the pass even if the second nozzles 117 are used. In this case, the printing device 101 prints the print image 203, the size in the Y direction of which is substantially equal to the first nozzle row length L, in a plurality of passes. The description "can print in one pass" in this application means that the printing device 101 can print in one pass when the printing device 101 does not deviate in the +Y direction or the −Y direction and does not means that the printing device 101 always prints in one pass. "Can print in one pass" is an expression indicating that the printing device 101 is allowed to print in a plurality of passes when the printing device 101 greatly deviates in the +Y direction or the −Y direction as described above. "Print in one pass" is an expression indicating that the printing device 101 prints in one pass when the printing device 101 does not greatly deviate in the +Y direction or the −Y direction and does not indicate that the printing device 101 prints in one pass even when the printing device 101 greatly deviates in the +Y direction or the −Y direction.

The Number of Passes and the Print Image

Figure 5:
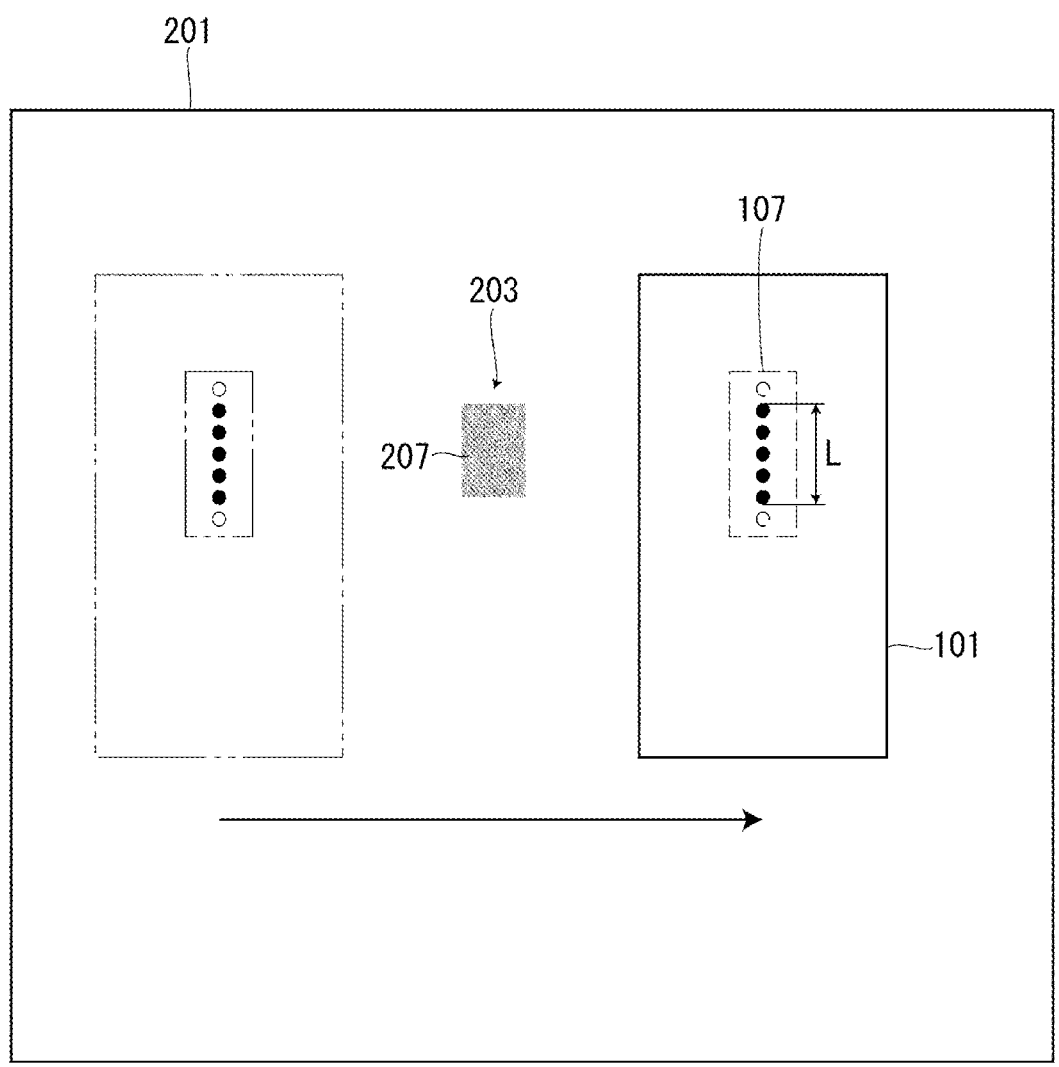
FIG. 5 is a diagram showing a state in which a first pass is performed when the printing device prints the print image separately in three passes.
Figure 6:
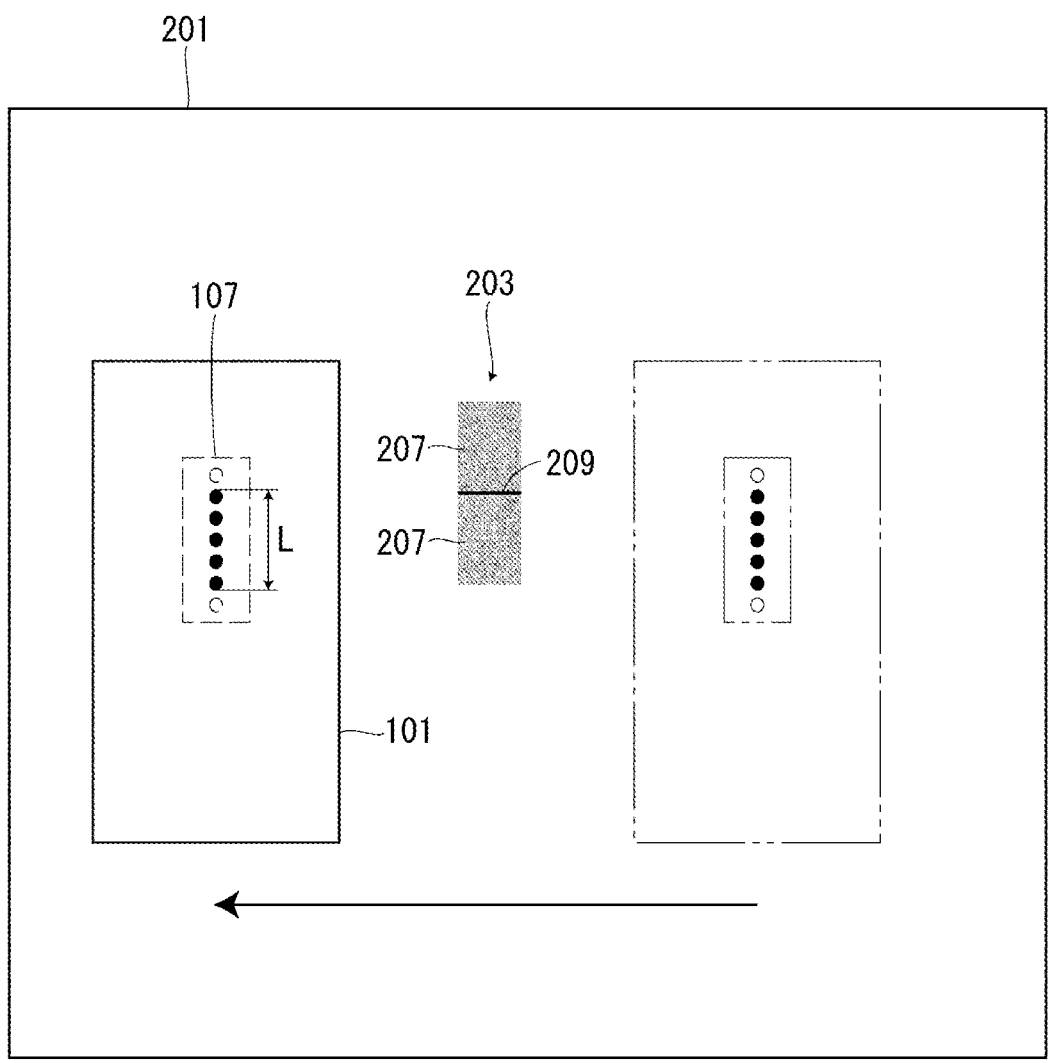
FIG. 6 is a diagram showing a state in which a second pass is performed when the printing device prints the print image separately in the three passes.
Figure 7:
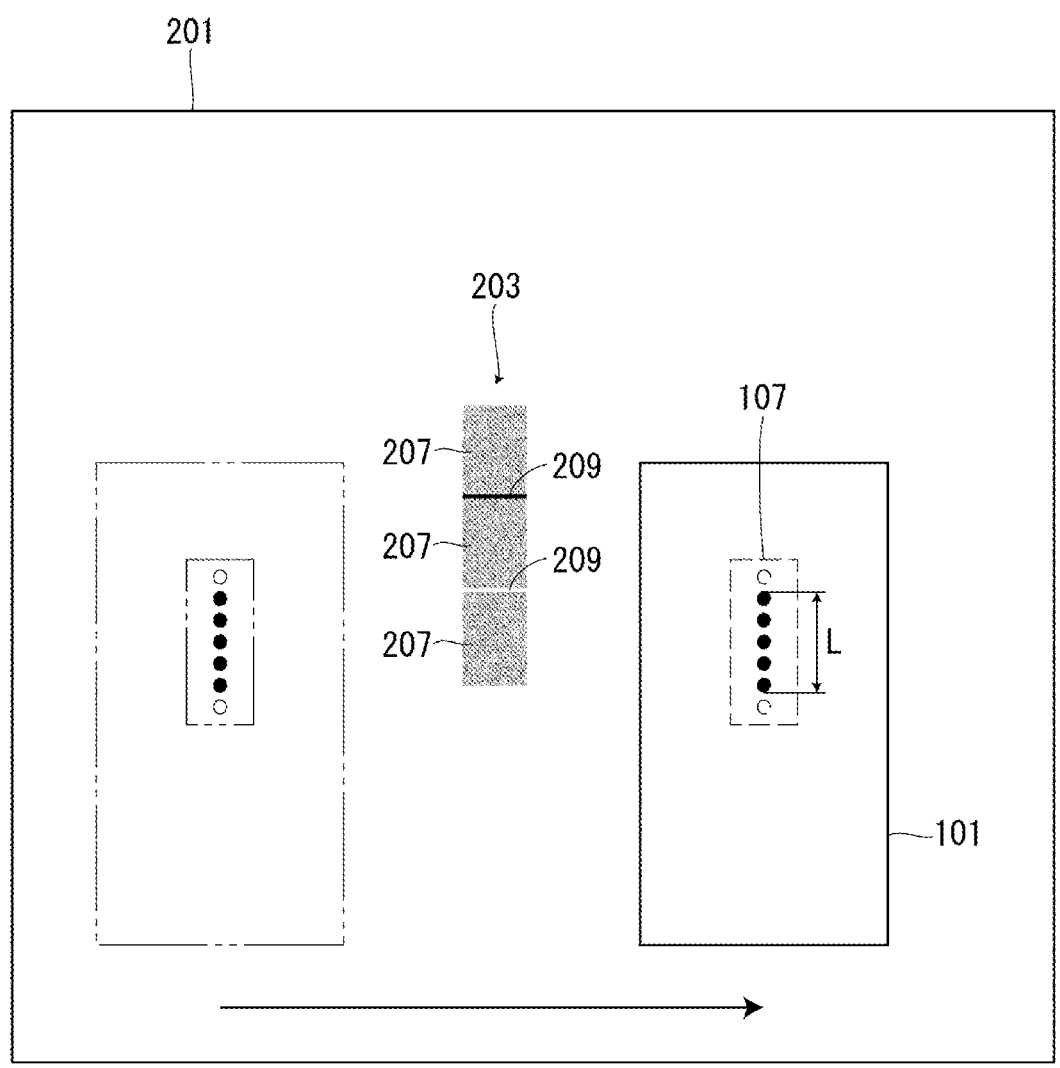
FIG. 7 is a diagram showing a state in which a third pass is performed when the printing device prints the print image separately in the three passes.

As explained above, the maximum size in the Y direction of the print image 203 that can be printed in one pass is substantially equal to the first nozzle row length L. Therefore, in order to print the print image 203, the size in the Y direction of which is larger than the first nozzle row length L, as shown in FIGS. 5 to 7, the printing device 101 needs to print the print image 203 separately in a plurality of passes. When the print image 203 is printed separately in the plurality of passes, the print images 203 printed in the respective passes are referred to as partial images 207. FIGS. 5 to 7 show a configuration in which, in the plurality of passes, movement of the printing device 101 in the +X direction and movement of the printing device 101 in the −X direction are alternately performed. However, the movement of the printing device 101 in the +X direction may be performed in any pass or the movement of the printing device 101 in the −X direction may be performed in any pass.

When the print image 203 is separately printed in the plurality of passes by the printing device 101, based on a measurement result of movement of the printing device 101 by the movement measuring section 109, the partial image 207 printed in a (m+1)-th pass is printed in a position corresponding to the partial image 207 printed in an m-th pass. However, it is likely that a plurality of partial images 207 printed in the plurality of passes overlap one another or gaps are formed among the plurality of partial images 207 because of a measurement error of the movement of the printing device 101 by the movement measuring section 109. In these cases, streaks 209 extending in the moving direction of the printing device 101, that is, the X direction occur on the print image 203. In an example shown in FIGS. 6 and 7, the streak 209 due to the overlap occur between a first partial image 207 and a second partial image 207 in the +Y direction and the streak 209 due to the gap occur between the second partial image 207 and a third partial image 207 in the +Y direction.

That is, the information processing device 1 in this embodiment can prevent the streaks 209 from occurring on the print image 203 by reducing the size of the print image 203 to cause the printing device 101 to print the print image 203 in one pass (see FIG. 8) instead of causing the printing device 101 to print the print image 203 separately in a plurality of passes.

Hardware Configuration of the Information Processing Device

Figure 9:
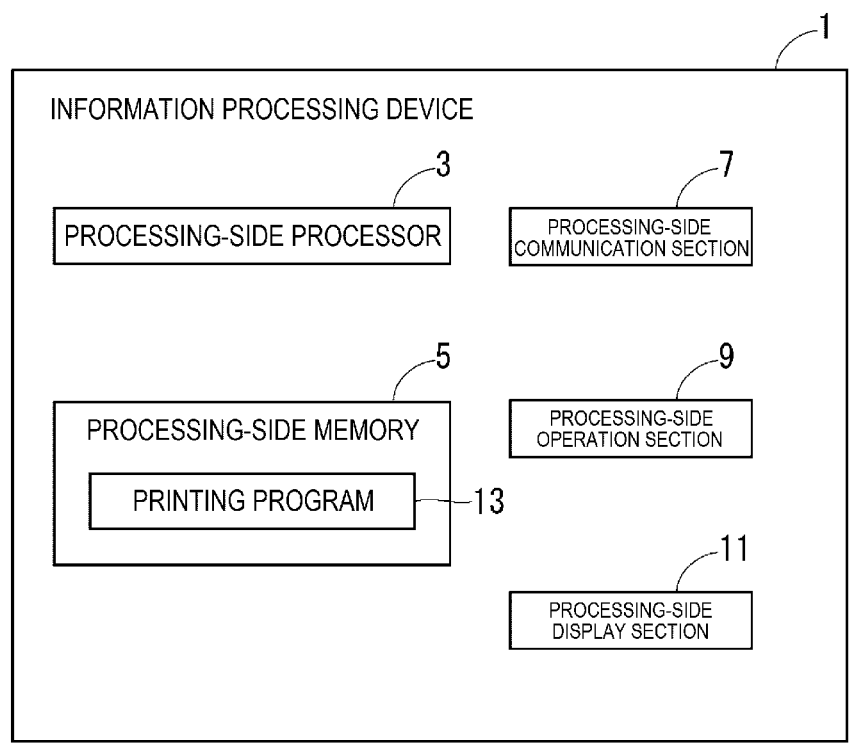
FIG. 9 is a block diagram showing a hardware configuration of an information processing device.

As shown in FIG. 9, the information processing device 1 includes a processing-side processor 3, a processing-side memory 5, a processing-side communication section 7, a processing-side operation section 9, and a processing-side display section 11.

The processing-side processor 3 executes various programs stored in the processing-side memory 5. The processing-side processor 3 is, for example, one or a plurality of CPUs (Central Processing Units). The processing-side processor 3 may be a hardware circuit such as an ASIC (Application Specific Integrated Circuit) or may have a configuration in which the one or more CPUs and the hardware circuit such as the ASIC perform processing in cooperation.

The processing-side memory 5 stores various programs and various data. The processing-side memory 5 includes, for example, a ROM (Read Only Memory), a RAM (Random Access Memory), and an EEPROM (Electrically Erasable Programmable Read-Only memory). The processing-side memory 5 may include a HDD (Hard Disk Drive) and an SSD (Solid State Drive).

The various programs stored in the processing-side memory 5 include a printing program 13. The printing program 13 is an application program corresponding to the printing device 101. The processing-side processor 3 executes the printing program 13 to thereby generate a printing job and transmits the generated printing job to the printing device 101.

The processing-side communication section 7 transmits and receives various data and various commands to and from the printing device 101. The processing-side communication section 7 includes a communication circuit that communicates with the printing device 101 by wire or radio.

The processing-side operation section 9 receives operation from the user. As the processing-side operation section 9, for example, a keyboard and a mouse can be used.

The processing-side display section 11 displays various screens. As the processing-side display section 11, for example, a liquid crystal display or an organic EL display (EL: Electro-Luminescence) can be used. The information processing device 1 may include a touch panel functioning as the processing-side operation section 9 and the processing-side display section 11.

Hardware Configuration of the Printing Device

Figure 10:
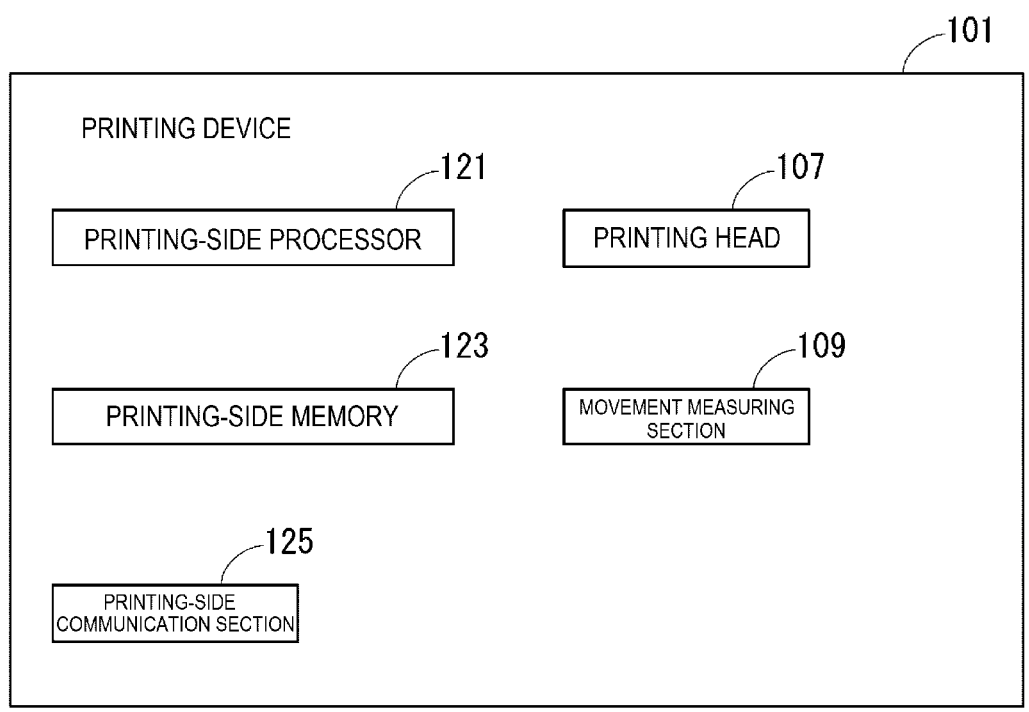
FIG. 10 is a block diagram showing a hardware configuration of the printing device.

As shown in FIG. 10, the printing device 101 includes a printing-side processor 121, a printing-side memory 123, a printing-side communication section 125, the printing head 107, and the movement measuring section 109.

The printing-side processor 121 executes various programs stored in the printing-side memory 123. The printing-side processor 121 is, for example, one or a plurality of CPUs. The printing-side processor 121 may be a hardware circuit such as an ASIC or may have a configuration in which the one or more CPUs and the hardware circuit such as the ASIC perform processing in cooperation.

The printing-side memory 123 stores various programs and various data. The printing-side memory 123 includes, for example, a ROM and a RAM. The printing-side memory 123 may include an EEPROM, a HDD, and an SSD.

The printing-side communication section 125 transmits and receives various data and various commands to and from the information processing device 1. The printing-side communication section 125 includes a communication circuit that communicates with the information processing device 1 by wire or radio.

Print Setting Screen

A print setting screen 31 displayed on the processing-side display section 11 is explained with reference to FIG. 11. Predetermined operation is performed on an initial screen displayed after a start of the printing program 13, whereby the print setting screen 31 is displayed. On the print setting screen 31, a preview display region 33, a size display field 35, a one-pass printing checkbox 37, an OK button 39, an insertion button 41, and a cancel button 43 are displayed.

In the preview display region 33, a printing preview of a print candidate image 45 is displayed. The user can move the print candidate image 45 in the preview display region 33 by performing, for example, drag operation on the print candidate image 45 displayed in the preview display region 33. Consequently, when a plurality of print candidate images 45 are displayed in the preview display region 33, a positional relation among the plurality of print candidate images 45 can be changed.

In the size display field 35, a print plan size of the print image 203 to be printed is displayed based on image data of the print candidate image 45 displayed in the preview display region 33. In the size display field 35, the print plan size acquired from the image data of the print candidate image 45 is displayed in default. In the size display field 35, the print plan size is displayed in a form of "p×q mm": p is a print plan size in the Y direction and q is a print plan size in the X direction.

The user can designate a desired print plan size instead of the print plan size displayed in the size display field 35 in default by inputting desired numerical values to the size display field 35. For example, the user inputs a desired numerical value to the size display field 35 about the print plan size in the Y direction using a software keyboard (not shown) displayed on the processing-side display section 11 together with the print setting screen 31. The print plan size in the X direction displayed in the size display field 35 is automatically changed according to the input print plant size in the Y direction such that an XY ratio of the print plan sizes is maintained. The XY ratio of the print plan sizes means a ratio of the print plan size in the Y direction and the print plan size in the X direction. For example, when the print plan size displayed in the size display field 35 in default is "120×27 mm" and "40" is input as the print plan size in the Y direction, the print plan size displayed in the size display field 35 is changed to "40×9 mm". The user may be capable of inputting a desired value to the size display field 35 about the print plan size in the X direction independently from the print plan size in the Y direction. In this case, the XY ratio of the print plan sizes can be changed. The user may operate, for example, a size display mark provided in the size display field 35 to display a pulldown list instead of using the software keyboard and select a desired size choice out of a plurality of size choices included in the pulldown list to designate a desired print plan size. The user may increase or reduce a size with other means for, for example, operating an up-down button provided in the size display field 35. The user may increase or reduce a size with pinch operation for expanding or reducing the print candidate image 45 displayed in the preview display region 33. The processing-side display section 11 may notify the user whether the set size in the Y direction is a size equal to or smaller than the first noise row length L to indicate to the user whether the printing device 101 can print in one pass. For example, the processing-side display section 11 is capable of performing the notification by changing a color of the size display field 35 or describing a message near the size display field 35.

Figure 8:
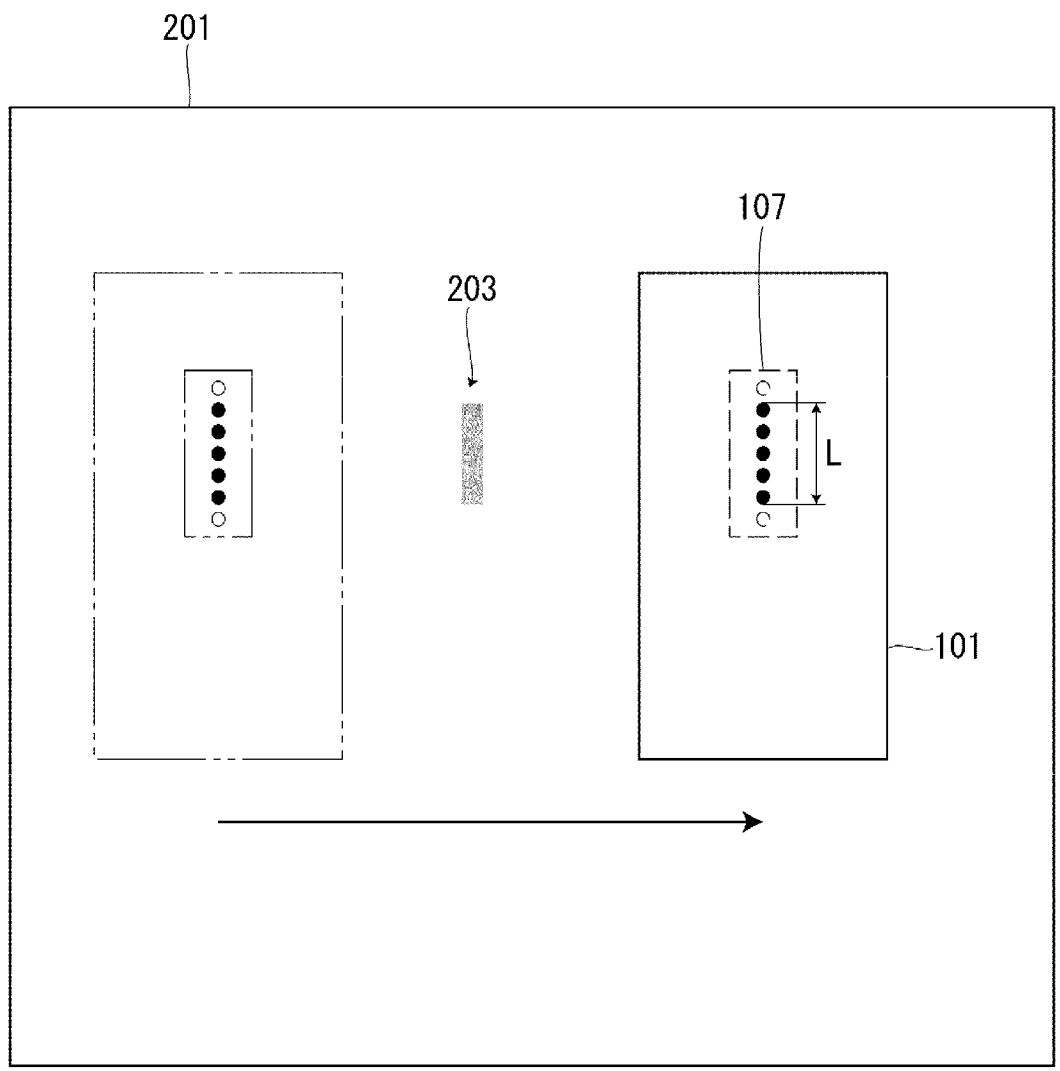
FIG. 8 is a diagram showing a state in which the printing device prints a reduced print image in one pass.

When the print plan size in the Y direction of the print image 203 is larger than the first nozzle row length L, the one-pass printing checkbox 37 receives selection about whether to cause the printing device 101 to print the print image 203 separately in a plurality of passes while keeping the size of the print image 203 (see FIGS. 5 to 7) or reduce the size of the print image 203 to cause the printing device 101 to print the print image 203 in one pass (see FIG. 8). That is, when the one-pass printing checkbox 37 is not checked, the information processing device 1 causes the printing device 101 to print the print image 203, the print plan size in the Y direction of which is larger than the first nozzle row length L, in a plurality of passes while keeping the size of the print image 203. On the other hand, when the one-pass printing checkbox 37 is checked, the information processing device 1 limits the print image 203, the print plan size in the Y direction of which is larger than the first nozzle row length L, to a size equal to or smaller than the first nozzle row length L to enable the printing device 101 to print the print image 203 in one pass.

The OK button 39 receives operation for deciding selection and input on the print setting screen 31. When the OK button 39 is operated, the information processing device 1 generates a printing job based on the image data of the print candidate image 45 displayed in the preview display region 33 and transmits the generated printing job to the printing device 101.

The insertion button 41 receives operation for prompting the user to designate the print candidate image 45. When the insertion button 41 is operated, the information processing device 1 causes the processing-side display section 11 to display an image selection screen and causes the processing-side display section 11 to additionally display, in the preview display region 33, the print candidate image 45 selected on the image selection screen. The information processing device 1 adds, as a default size, a maximum size in which the print candidate image 45 can be printed in one pass. However, the information processing device 1 is not limited to this. The information processing device 1 may select, on the image selection screen, as the print candidate image 45, an image obtained by performing photographing using a photographing function of the information processing device 1. The information processing device 1 may select an image received from another device as the print candidate image 45. The information processing device 1 may prompt the user to input a character string and select an image of the input character string as the print candidate image 45.

The cancel button 43 receives operation for returning to the initial screen (not shown). When the cancel button 43 is operated, the information processing device 1 causes the processing-side display section 11 to display the initial screen.

Producing Method for a Print: First Embodiment

A first embodiment of a producing method for the print 205 executed by the printing system Sy is explained with reference to FIGS. 12 to 15.

In step S01, the information processing device 1 determines whether the insertion button 41 is operated on the print setting screen 31. When determining that the insertion button 41 is operated, the information processing device 1 proceeds to step S02. On the other hand, when determining that the insertion button 41 is not operated, the information processing device 1 repeats step S01 until determining that the insertion button 41 is operated.

In step S02, the information processing device 1 causes the processing-side display section 11 to display the image selection screen and causes the processing-side display section 11 to display, in the preview display region 33, the print candidate image 45 selected on the image selection screen. The information processing device 1 causes the processing-side display section 11 to display, in the size display field 35, a print plan size of the print image 203 to be printed based on image data of the selected print candidate image 45. The information processing device 1 acquires the print plan size of the print image 203 from the image data of the print candidate image 45.

In step S03, the information processing device 1 determines whether moving operation for the print candidate image 45 displayed in the preview display region 33 is performed. When determining that moving operation for the print candidate image 45 displayed in the preview display region 33 is performed, the information processing device 1 proceeds to step S04.

In step S04, the information processing device 1 moves the print candidate image 45 in the preview image region 33 based on the moving operation for the print candidate image 45. Thereafter, the information processing device 1 returns to step S03.

On the other hand, when determining in step S03 that moving operation for the print candidate image 45 displayed in the preview display region 33 is not performed, the information processing device 1 proceeds to step S05.

In step S05, the information processing device 1 determines whether input operation to the size display field 35 is performed. When determining that input operation to the size display field 35 is performed, the information processing device 1 proceeds to step S06.

In step S06, the information processing device 1 updates, based on a numerical value input to the size display field 35, the print plan size displayed in the size display field 35. Consequently, the print plan size of the print image 203 is designated by the user. When the one-pass printing checkbox 37 is checked, an upper limit of the print plan size in the Y direction displayed in the size display field 35 is the first nozzle row length L. When the one-pass printing checkbox 37 is not checked, the print plan size in the Y direction displayed in the size display field 35 can exceed the first nozzle row length L. When a plurality of print candidate images 45 are displayed in the preview display region 33, the information processing device 1 changes, according to the designated size, a display size of the print candidate image 45 selected in the preview display region 33. Thereafter, the information processing device 1 returns to step S03.

On the other hand, when determining in step S05 that input operation to the size display field 35 is not performed, the information processing device 1 proceeds to step S07.

In step S07, the information processing device 1 determines whether operation for the one-pass printing checkbox 37 is performed. When determining that operation for the one-pass printing checkbox 37 is performed, the information processing device 1 proceeds to step S08.

In step S08, the information processing device 1 switches, every time the operation for the one-pass printing checkbox 37 is performed, a state in which the one-pass printing checkbox 37 is checked and a state in which the one-pass printing checkbox 37 is not checked.

In step S09, the information processing device 1 determines whether the print plan size of the print image 203 is a one-pass printable size, which is a size that the printing device 101 is capable of printing in one pass. That is, when the print plan size in the Y direction displayed in the size display field 35 is equal to or smaller than the first nozzle row length L, the information processing device 1 determines that the print plan size of the print image 203 is the one-pass printable size. On the other hand, when the print plan size in the Y direction displayed in the size display field 35 is larger than the first nozzle row length L, the information processing device 1 determines that the print plan size of the print image 203 is not the one-pass printable size.

When determining in step S09 that the print plan size of the print image 203 is the one-pass printable size, the information processing device 1 returns to step S03. That is, in this case, the print plan size displayed in the size display field 35 is not changed.

On the other hand, when determining in step S09 that the print plan size of the print image 203 is not the one-pass printable size, the information processing device 1 proceeds to step S10.

Figure 11:
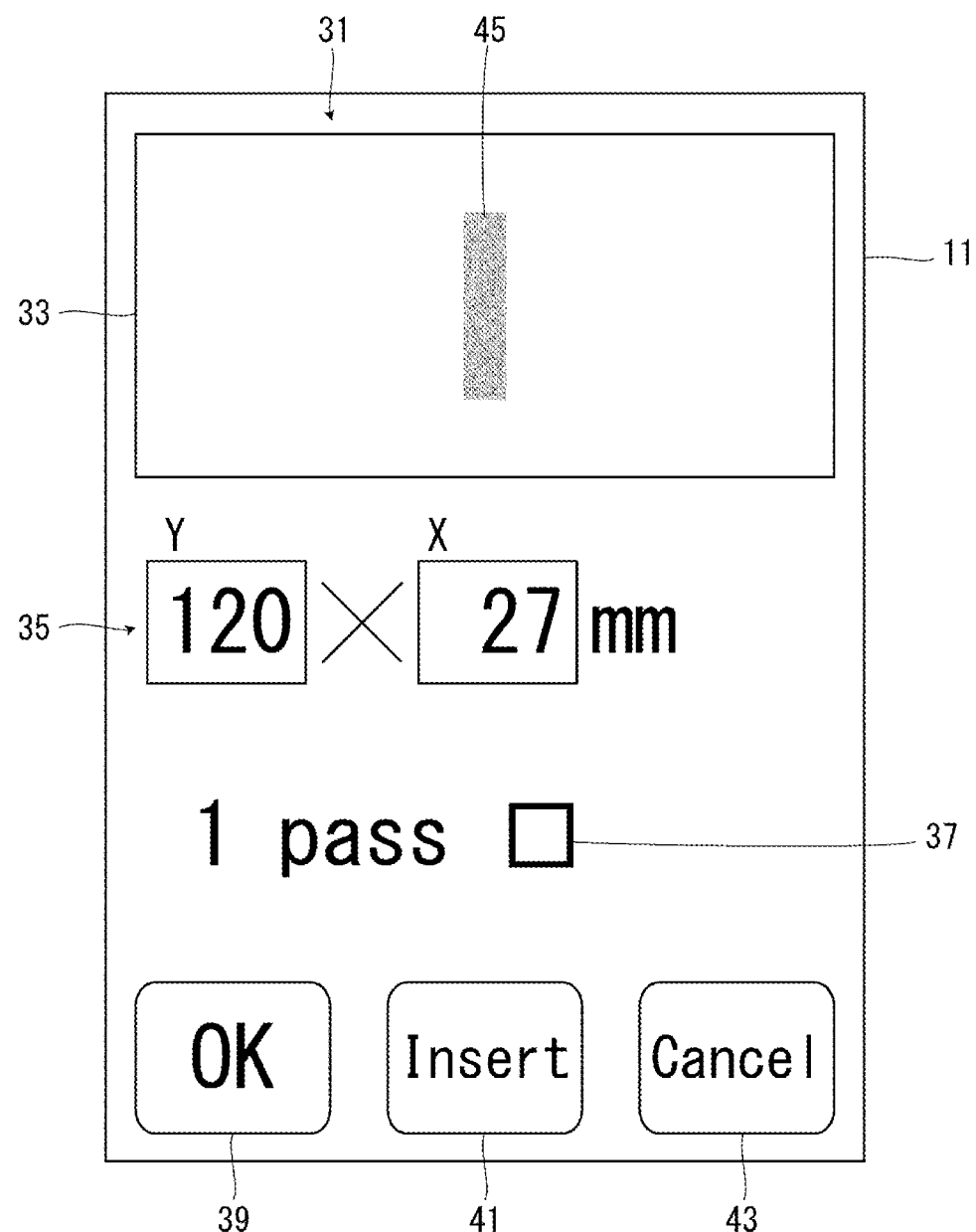
FIG. 11 is a diagram showing a state in which a one-pass printing checkbox is not checked on a print setting screen.
Figure 12:
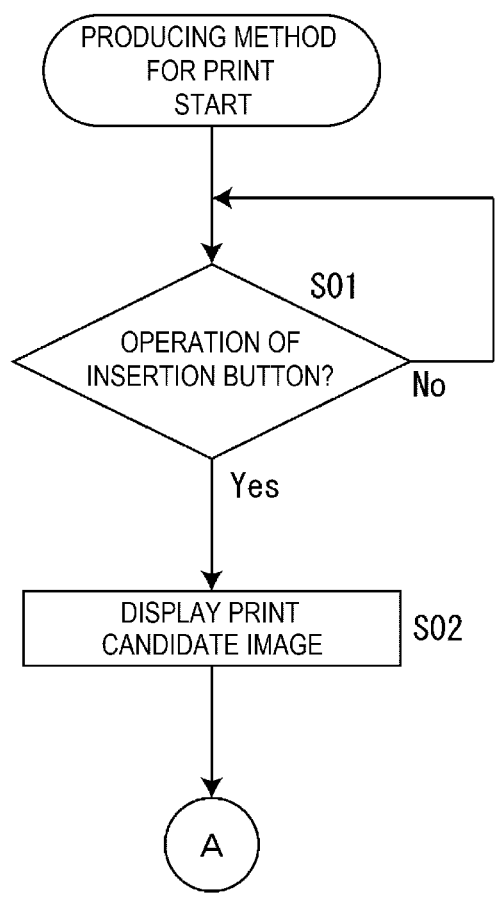
FIG. 12 is a flowchart showing a first embodiment of a producing method for a print.
Figure 13:
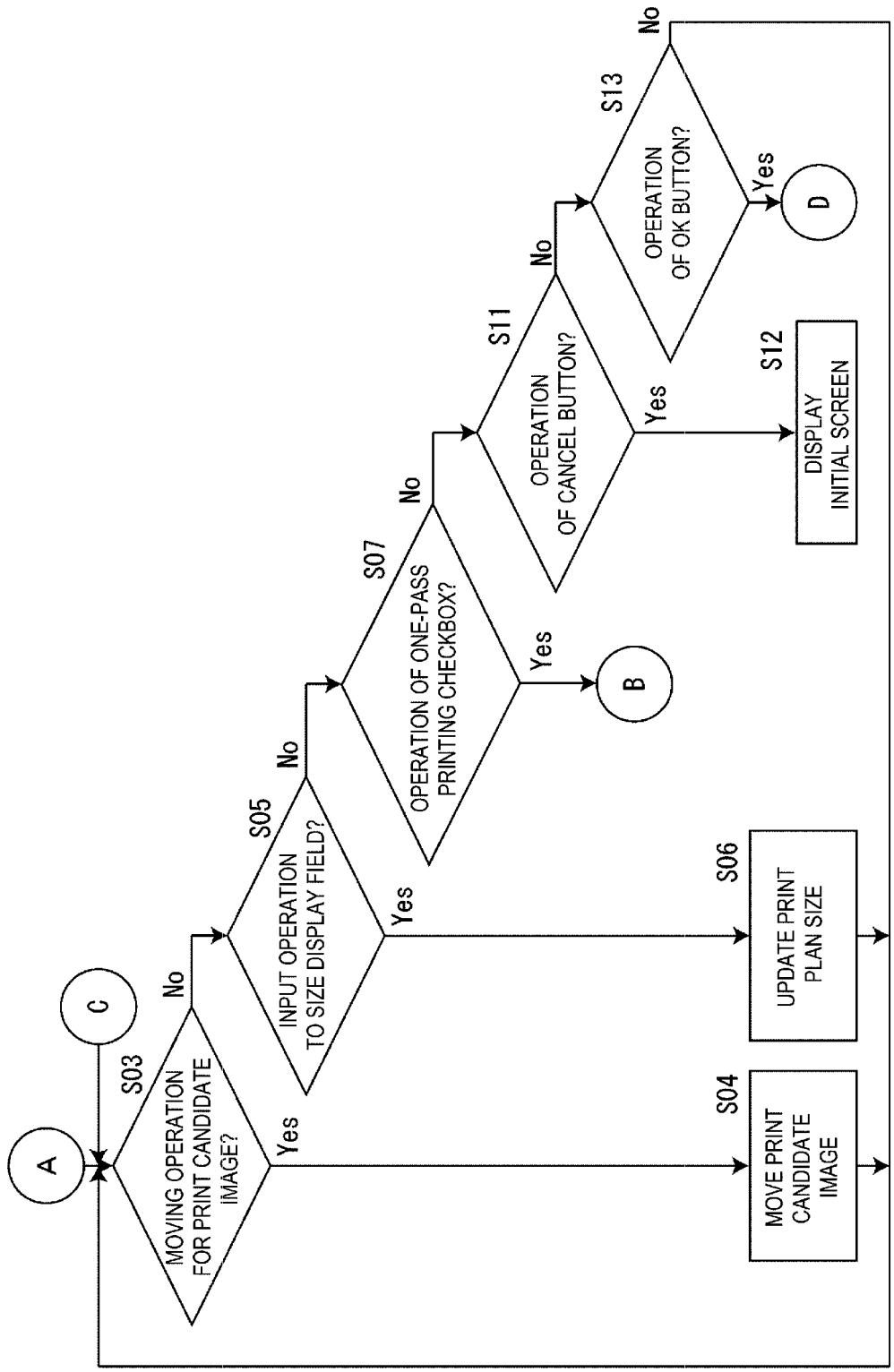
FIG. 13 is a flowchart following FIG. 12.
Figure 14:
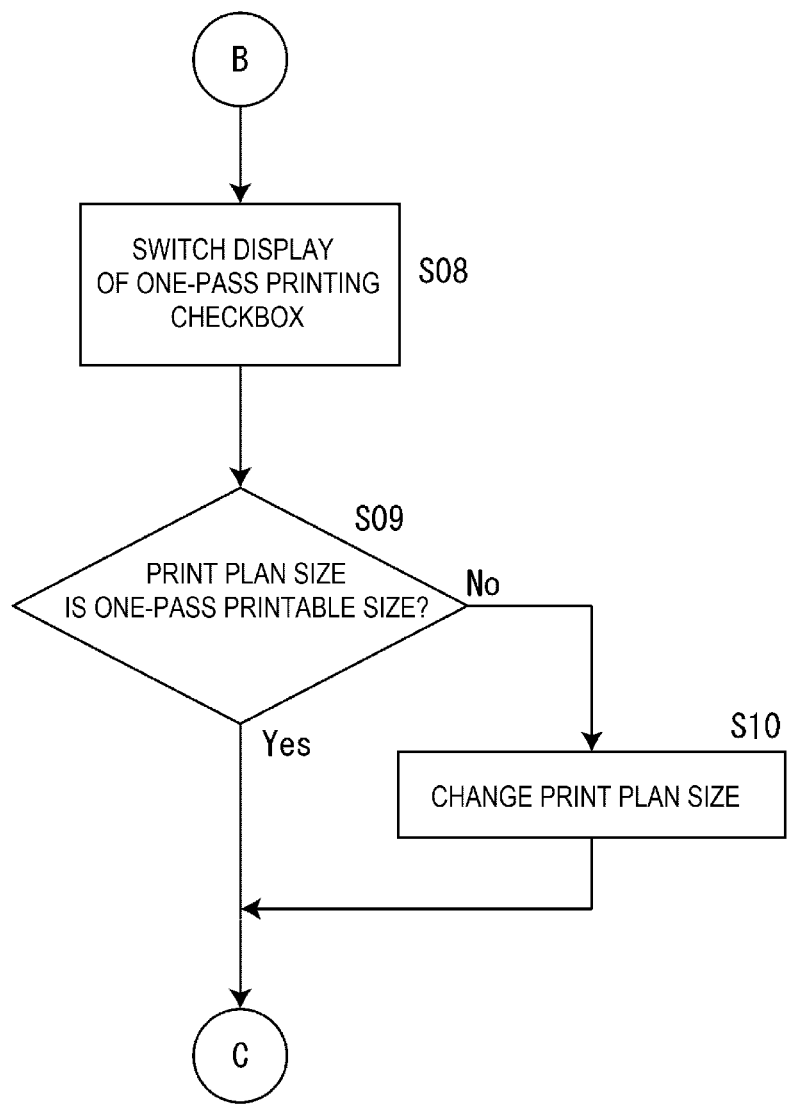
FIG. 14 is a flowchart following FIG. 13.
Figure 15:
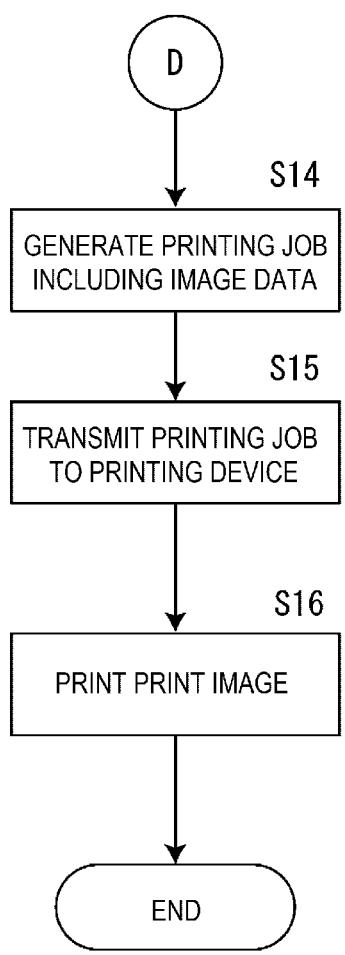
FIG. 15 is a flowchart following FIG. 13.
Figure 16:
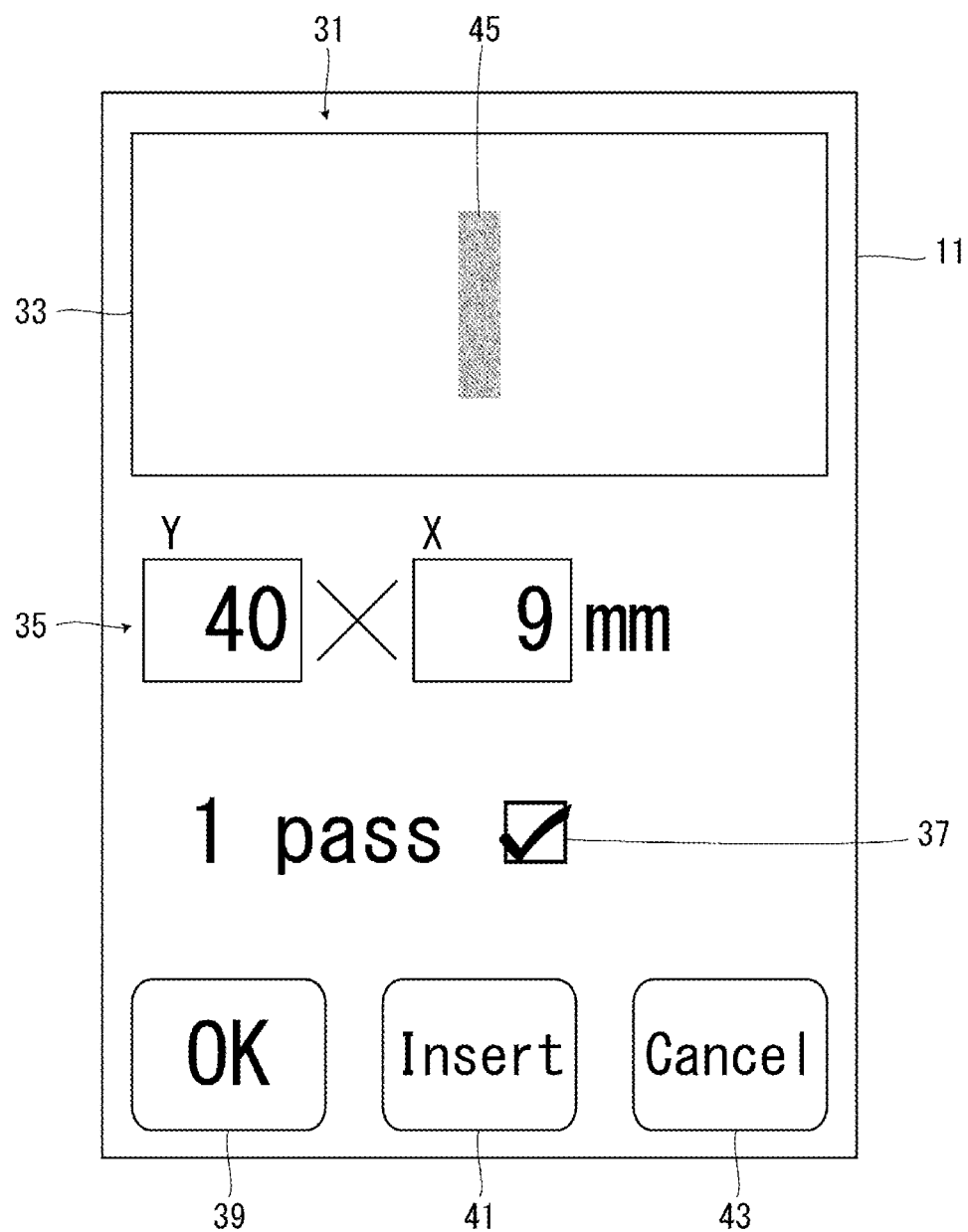
FIG. 16 is a diagram showing a state in which the one-pass printing checkbox is checked on the print setting screen.

In step S10, the information processing device 1 changes, from the state shown in FIG. 11, the print plan size displayed in the size display field 35 to the one-pass printable size as shown in FIG. 16. That is, the information processing device 1 changes the print plan size in the Y direction displayed in the size display field 35 to the first nozzle row length L or a predetermined size smaller than the first nozzle row length L and changes the print plan size in the X direction displayed in the size display field 35 to maintain the XY ratio. At this time, the information processing device 1 may change a size about the print candidate image 45 displayed in the preview display region 33. Thereafter, the information processing device 1 returns to step S03.

On the other hand, when determining in step S07 that operation for the one-pass printing checkbox 37 is not performed, the information processing device 1 proceeds to step S11.

In step S11, the information processing device 1 determines whether operation for the cancel button 43 is performed. When determining that operation for the cancel button 43 is performed, the information processing device 1 proceeds to step S12.

In step S12, the information processing device 1 causes the processing-side display section 11 to display the initial screen. That is, the information processing device 1 switches the display of the processing-side display section 11 from the print setting screen 31 to the initial screen.

On the other hand, when determining in step S11 that operation for the cancel button 43 is not performed, the information processing device 1 proceeds to step S13.

In step S13, the information processing device 1 determines whether operation for the OK button 39 is performed. When determining that operation for the OK button 39 is performed, the information processing device 1 proceeds to step S14.

On the other hand, when determining in step S13 that operation for the OK button 39 is not performed, the information processing device 1 returns to step S03.

In step S14, the information processing device 1 generates a printing job including the image data of the print candidate image 45. At this time, the information processing device 1 magnifies the image data according to the print plan size to generate the printing job.

In step S15, the information processing device 1 transmits the generated printing job to the printing device 101.

In step S16, the printing device 101 prints, based on the image data included in the received printing job, the print image 203 having the same size as the print plan size on the medium 201. For example, when the first nozzle row length L is 40 mm and the print plan size displayed in the size display field 35 is 40×27 mm, the print image 203 having the size of 40×27 mm can be printed in one pass. For example, when the first nozzle row length L is 40 mm and the print plan size displayed in the size display field 35 is 120×27 mm, the print image 203 having the size of 120×27 mm can be printed in three passes.

As explained above, according to the first embodiment of the producing method for the print 205, the user checks the one-pass printing checkbox 37, whereby the printing device 101 can print the print image 203 reduced from the print plan size in one pass. Therefore, it is possible to easily prevent the streaks 209 from being formed on the print image 203 because the print image 203 is printed separately in a plurality of passes. Accordingly, it is possible to produce the print 205 having high quality.

Functional Configuration of the Processing-Side Processor: First Embodiment

Figure 17:
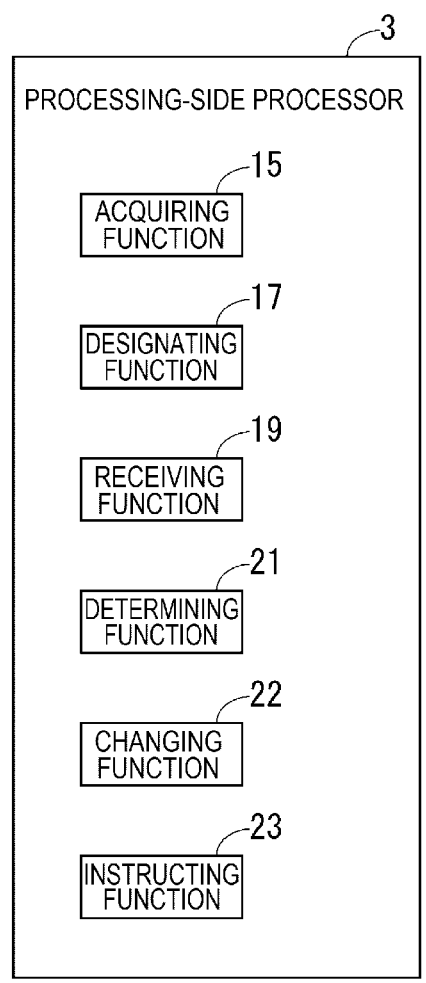
FIG. 17 is a diagram showing a first embodiment of a functional configuration of a processing side processor.

A first embodiment of a functional configuration of the processing-side processor 3 is explained with reference to FIG. 17. The processing-side processor 3 includes an acquiring function 15, a designating function 17, a receiving function 19, a determining function 21, a changing function 22, and an instructing function 23. These functions are realized by the processing-side processor 3 executing the printing program 13.

The acquiring function 15 acquires image data for the printing device 101 to print the print image 203. That is, the acquiring function 15 acquires the image data of the print candidate image 45 selected on the image selection screen.

The designating function 17 prompts the user to designate a print plan size of the print image 203. That is, the designating function 17 prompts the user to input a desired print plan size to the size display field 35 to prompt the user to designate the print plan size.

The receiving function 19 selectively receives a normal printing request and a one-pass printing request from the user. That is, the receiving function 19 receives the normal printing request when the print plan size is not the one-pass printable size. The receiving function 19 receives the one-pass printing request when the print plan size is the one-pass printable size. The normal printing request means a request from the user for, when the print plan size in the Y direction of the print image 203 is larger than the first nozzle row length L, causing the printing device 101 to print the print image 203 separately in a plurality of passes while keeping the size of the print image 203. The one-pass printing request means a request from the user for causing the printing device 101 to print the print image 203 in one pass.

The determining function 21 determines whether the print plan size of the print image 203 is the one-pass printable size, which is a size in which the printing device 101 is capable of printing in one pass. That is, when the print plan size in the Y direction displayed in the size display field 35 is equal to or smaller than the first nozzle row length L, the determining function 21 determines that the print plan size of the print image 203 is the one-pass printable size. On the other hand, when the print plan size in the Y direction displayed in the size display field 35 is larger than the first nozzle row length L, the determining function 21 determines that the print plan size of the print image 203 is not the one-pass printable size.

When it is determined that the print plan size is not the one-pass printable size, the changing function 22 changes the print plan size to the one-pass printable size. That is, when the print plan size displayed in the size display field 35 is not the one-pass printable size and the one-pass printing checkbox 37 is checked, a limiting function 29 changes the print plan size displayed in the size display field 35 to the one-pass printable size.

The instructing function 23 performs a printing instruction for instructing the printing device 101 to print the print image 203. That is, the instructing function 23 generates magnified image data obtained by magnifying the image data of the print candidate image 45 to a printing size and transmits the generated magnified image data to the printing device 101 to perform the printing instruction. The printing instruction can be classified into a one-pass printing instruction in the case in which the print plan size is the one-pass printable size and a normal printing instruction in the case in which the print plan size is not the one-pass printable size.

As explained above, when determining that the print plan size of the print image 203 is not the one-pass printable size, by changing the print plan size of the print image 203 to the one-pass printable size, the information processing device 1 in this embodiment can cause the printing device 101 to print the print image 203 in one pass (see FIG. 8). Therefore, it is possible to prevent the streaks 209 from occurring on the print image 203 because the print image 203 is printed separately in a plurality of passes.

Functional Configuration of the Processing-Side Processor: Second Embodiment

Figure 18:
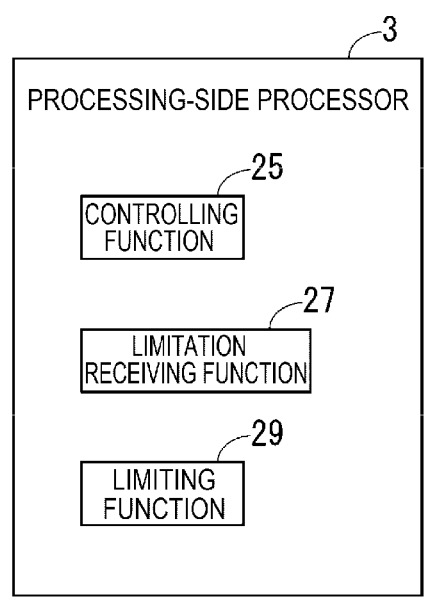
FIG. 18 is a diagram showing a second embodiment of the functional configuration of the printing side processor.

A second embodiment of the functional configuration of the processing-side processor 3 is explained with reference to FIG. 18. The processing-side processor 3 includes a controlling function 25, a limitation receiving function 27, and the limiting function 29. These functions are realized by the processing-side processor 3 executing the printing program 13.

The controlling function 25 controls the printing device 101. For example, the controlling function 25 transmits a printing job to the printing device 101 to control the printing device 101.

The limitation receiving function 27 receives an instruction for limiting the print plan size of the print image 203 to the one-pass printable size. That is, when the one-pass printing checkbox 37 is checked, the limitation receiving function 27 receives the instruction for limiting the print plan size to the one-pass printable size.

When the limitation receiving function 27 receives the instruction for limiting the print plan size to the one-pass printable size, the limiting function 29 limits the print plan size to be the one-pass printable size. That is, when the print plan size displayed in the size display field 35 is not the one-pass printable size and the one-pass printing checkbox 37 is checked, the limiting function 29 changes the print plan size displayed in the size display field 35 to the one-pass printable size. When the one-pass printing checkbox 37 is checked, the limiting function 29 limits the print plan size in the Y direction displayed in the size display field 35 to set the first nozzle row length L as an upper limit.

Producing Method for a Print: Second Embodiment

Figure 19:
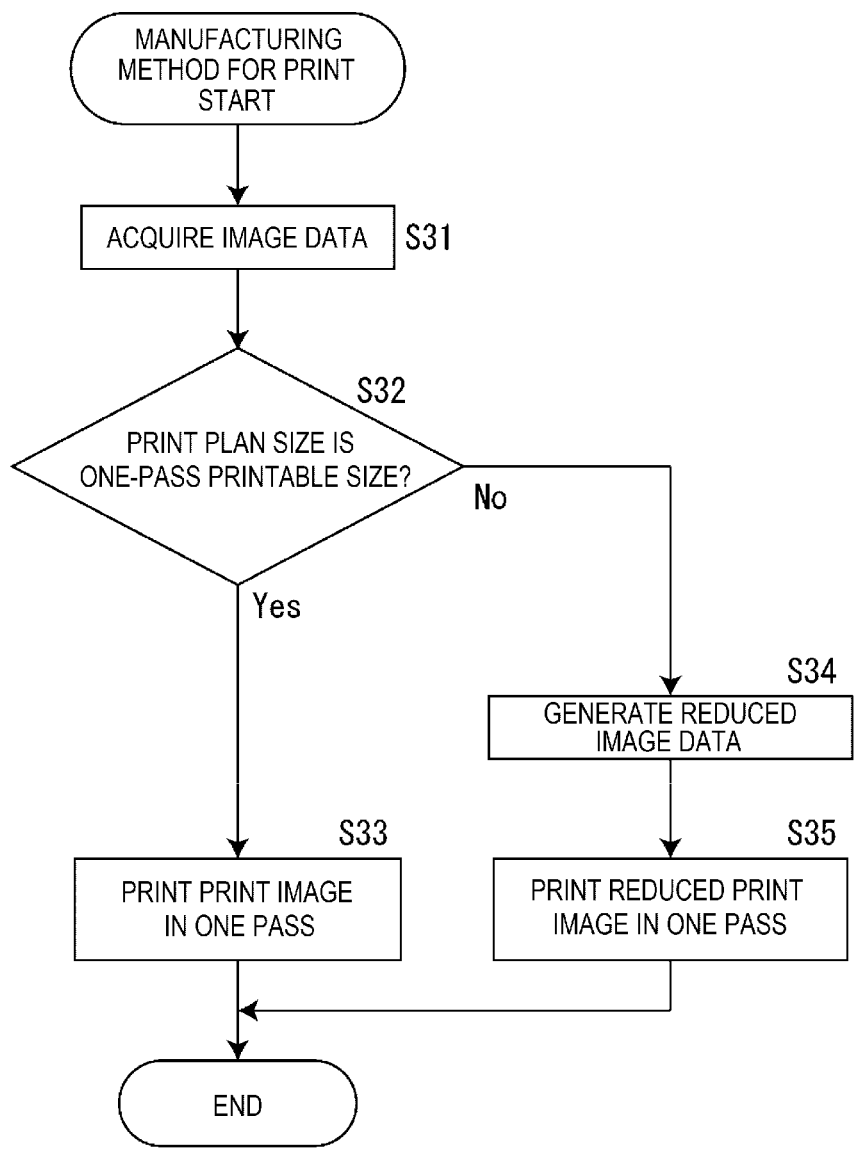
FIG. 19 is a flowchart showing a second embodiment of the producing method for a print.

A second embodiment of the producing method for the print 205 executed by the printing system Sy is explained with reference to FIG. 19. The second embodiment is different from the first embodiment in that, instead of the information processing device 1, the printing device 101 determines whether the print plan size of the print image 203 is the one-pass printable size. Explanation about the similarities to the first embodiment is omitted.

In step S31, the printing device 101 acquires image data. For example, the printing device 101 receives a printing job including the image data from the information processing device 1 to acquire the image data. Alternatively, the printing device 101 may acquire the image data from the device other than the information processing device 1. In this case, the printing system Sy may not include the information processing device 1. Further, the printing device 101 may use the image data stored in the printing-side memory 123 in advance.

In step S32, the printing device 101 determines whether the print plan size of the print image 203 is the one-pass printable size. When determining that the print plan size of the print image 203 is the one-pass printable size, the printing device 101 proceeds to step S33.

In step S33, the printing device 101 prints, based on the acquired image data, the print image 203 having the same size as the print plan size on the medium 201 in one pass.

On the other hand, when determining in step S32 that the print plan size of the print image 203 is not the one-pass printable size, the printing device 101 proceeds to step S34.

In step S34, the printing device 101 generates reduced image data obtained by reducing the acquired image data.

In step S35, the printing device 101 prints, based on the generated reduced image data, the print image 203 reduced from the print plan size on the medium 201 in one pass.

As explained above, according to the second embodiment of the producing method for the print 205, when determining that the print plan size is not the one-pass printable size, the printing device 101 prints the print image 203 reduced from the print plan size in one pass. Therefore, it is possible to prevent the streaks 209 from occurring on the print image 203 because the print image 203 is printed separately in a plurality of passes. Accordingly, it is possible to produce the print 205 having high quality.

Other Modifications

The present disclosure is not limited to the embodiments explained above. It goes without saying that various configurations are adaptable without departing from the gist of the present disclosure. For example, the embodiments can be changed to the following modes besides the above description. The embodiments and modifications may be respectively combined. The disclosure can be grasped in various viewpoints such as an invention of a printing system, an invention of a program, and an invention of a producing method for a print.

Figure 20:
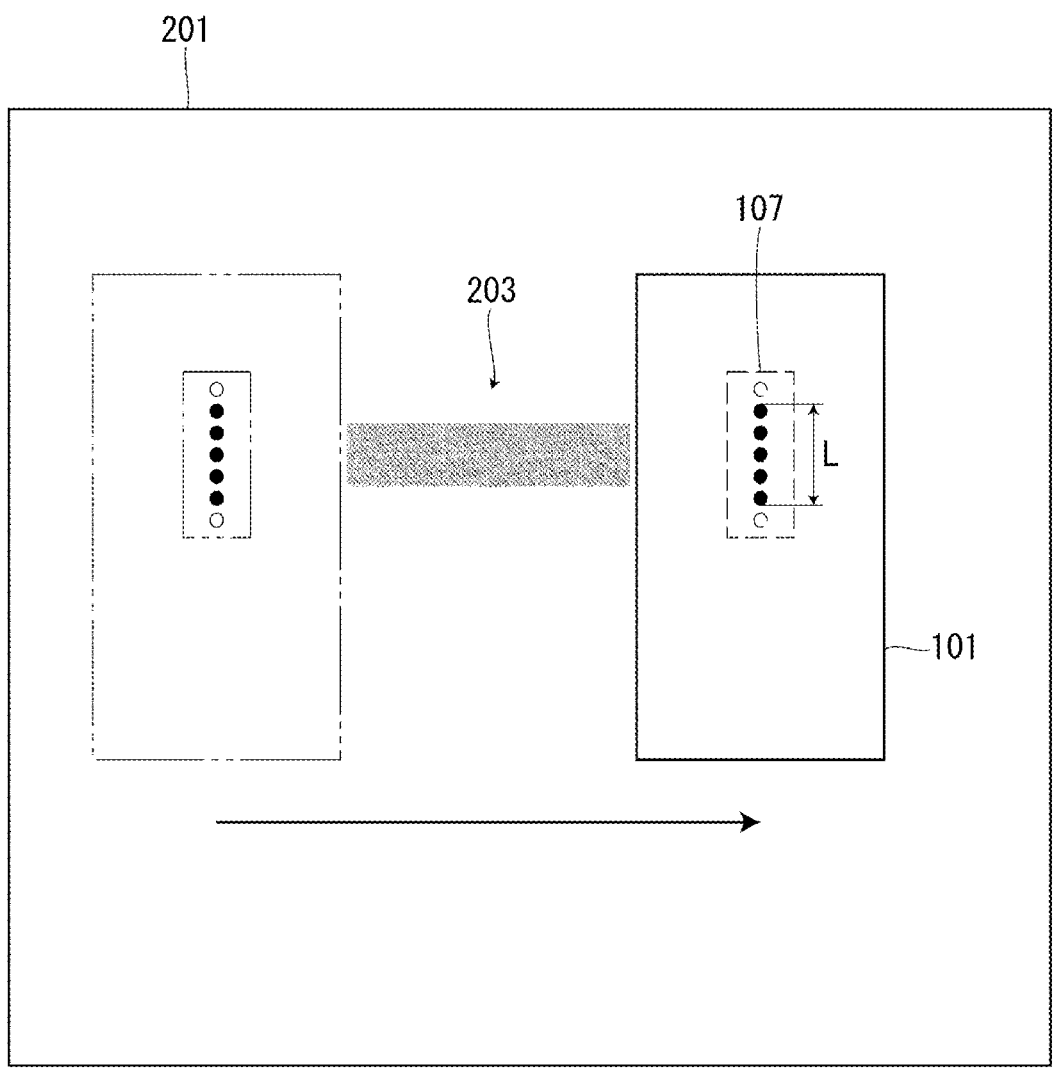
FIG. 20 is a diagram showing a state in which the printing device prints a rotated print image in one pass.

The instructing function 23 of the processing-side processor 3 is not limited to the configuration for transmitting the reduced image data to the printing device 101 to perform the one-pass printing instruction and may be configured to, for example, transmit rotated image data to the printing device 101 to perform the one-pass printing instruction. That is, when it is determined that the print plan size of the print image 203 is not the one-pass printable size, the instructing function 23 generates rotated image data obtained by rotating the image data of the print candidate image 45 to enable the printing device 101 to print the print image 203 in one pass and transmits the generated rotated image data to the printing device 101 to perform the one-pass printing instruction. Consequently, as shown in FIG. 20, the print image 203 rotated to enable the printing device 101 to print the print image 203 in one pass is printed in one pass. In FIG. 20, the print image 203 rotated 90° is printed. However, a rotation angle of the print image 203 is not particularly limited. For example, the print image 203 rotated as a minimum rotation angle printable in one pass may be printed.

A method of enabling printing in one pass is not limited to the operation of the one-pass printing checkbox 37. For example, a one-pass printing button may be provided instead of the one-pass printing checkbox 37. When the one-pass printing button is operated in a state in which a size unprintable in one pass is set, the unprintable size may be automatically changed to a maximum size printable in one pass. A size to which the unprintable size is automatically changed is not limited to the maximum size and may be a size smaller than the maximum size if the size can be printed in one pass.

The instructing function 23 of the processing-side processor 3 is not limited to the configuration for transmitting the reduced image data or the rotated image data to the printing device 101 to perform the one-pass printing instruction and may have a configuration for transmitting image data not reduced or rotated and a command including a size for printing the print image 203 to the printing device 101 to perform the one-pass printing instruction. In this case, the printing device 101 generates, based on the received command, reduced image data obtained by reducing the received image data to be printable in one pass and prints the reduced print image 203 on the medium 201 based on the generated reduced image data. Alternatively, the printing device 101 may generate, based on the received command, rotated image data obtained by rotating the received image data to be printable in one pass and print the rotated print image 203 on the medium 201 based on the generated rotated image data.

The printing head 107 is not limited to the inkjet head and may be, for example, a thermal head that performs printing in a thermal transfer scheme.

Naturally, the shape and contents of the screen of the printing device 101 are not limited to the embodiments.

Notes

A printing program and a producing method for a print are noted below.

A printing program causes a computer to realize: a determining function for determining whether a print plan size of a print image is a one-pass printable size, which is a size printable in one pass by a printing device that is manually moved with respect to a medium to perform printing on the medium; a changing function for, when it is determined that the print plan size is not the one-pass printable size, changing the print plan size to the one-pass printable size; and an instructing function for performing a one-pass printing instruction for instructing the printing device to print the print image in the one pass.

With this configuration, even when it is determined that the print plan size is not the one-pass printable size, the printing device prints the print image in the one pass based on the one-pass printing instruction. Therefore, it is possible to prevent streaks from occurring on the print image because the print image is printed separately in a plurality of passes.

The processing-side processor 3 is an example of the "computer".

In this case, it is preferable that the printing program causes the computer to realize a receiving function for selectively receiving a normal printing request and a one-pass printing request from a user, and, when the normal printing request is received, without performing the one-pass printing instruction, the instructing function instructs the printing device to print the print image and, when the one-pass printing request is received, the instructing function performs the one-pass printing instruction.

With this configuration, when it is determined that the print plan size is not the one-pass printable size, it is possible to prompt the user to select whether to cause the printing device to print the print image in a plurality of passes or cause the printing device to print the print image in the one pass.

In this case, it is preferable that the instructing function performs the one-pass printing instruction to instruct the printing device to print the print image in a maximum size printable in the one pass by the printing device.

With this configuration, it is possible to cause the printing device to print the print image in the maximum size printable in the one pass by the printing device.

In this case, it is preferable that the printing program causes the computer to realize a designating function for prompting the user to designate the print plan size, and the determining function determines whether the print plan size designated by the user is the one-pass printable size.

With this configuration, it is possible to prompt the user to designate the print plan size of the print image printed in one pass by the printing device.

In this case, it is preferable that the printing program causes the computer to realize an acquiring function for acquiring image data for the printing device to print the print image, and the instructing function generates reduced image data obtained by reducing the image data to enable the printing device to print the print image in the one pass and transmits the generated reduced image data.

With this configuration, by transmitting the reduced image data obtained by reducing the image data to the printing device, it is possible to cause the printing device to print the print image in the one pass.

In this case, it is preferable that the printing program causes the computer to realize an acquiring function for acquiring image data for the printing device to print the print image, and the instructing function generates rotated image data obtained by rotating the image data to enable the printing device to print the print image in the one pass and transmits the generated rotated image data to perform the one-pass printing instruction.

With this configuration, by transmitting the rotated image data obtained by rotating the image data to the printing device, it is possible to cause the printing device to print the print image in the one pass.

A printing program causes a computer to realize: a controlling function for controlling a printing device, which is manually moved with respect to a medium to perform printing on the medium, to print a print image on the medium; a limitation receiving function for receiving, from a user, an instruction for limiting a print plan size of the print image to a one-pass printable size, which is a size printable in one pass by the printing device; and a limiting function for, when the limitation receiving function receives the instruction, limiting the print plan size to be the one-pass printable size.

A producing method for producing a print is a producing method for producing a print by a printing system including a printing device that is manually moved with respect to a medium to perform printing on the medium, the producing method including: causing the printing system to determine whether a print plan size of a print image is a one-pass printable size, which is a size printable in one pass by the printing device; when it is determined that the print plan size is not the one-pass printable size, causing the printing system to change the print plan size to the one-pass printable size; and causing the printing device to print the print image in the one pass.

With this configuration, even when it is determined that the print plan size is not the one-pass printable size, the printing device prints the print image in the one pass. Therefore, it is possible to prevent streaks from occurring on the print image because the print image is printed separately in a plurality of passes.

A producing method for producing a print is a producing method for producing produce a print on which a print image is printed by manually moving a printing device with respect to a medium, the producing method including: causing a printing system including the printing device to receive, from a user, an instruction for limiting a print plan size of the print image to a one-pass printable size, which is a size printable in one pass by the printing device; in a first case in which the printing system receives the instruction, causing the printing system to limit the print plan size of the print image to the one-pass printable size and then causing the printing device to perform printing and producing the print; and, in a second case in which the printing system does not receive the instruction, causing the printing system to set the print plan size of the print image to a size larger than the one-pass printable size, causing the printing device to perform printing in the size to produce the print.

What is claimed is:

1. A non-transitory computer-readable storage medium storing a printing program for causing a computer to realize:
   a designating function for prompting a user to designate a print plan size of a print image;
   a change instructing function for prompting the user to input a change instruction separately from designation of the print plan size by the designating function;
   a changing function for, when the print plan size is not a one-pass printable size, automatically changing the print plan size to the one-pass printable size in response to input of the change instruction by the change instructing function, the one-pass printable size being a size printable in one pass by a printing device that is manually moved with respect to a medium to perform printing on the medium; and
   an instructing function for performing a one-pass printing instruction for instructing the printing device to print the print image in the print plan size.

2. The non-transitory computer-readable storage medium according to claim 1, wherein the one-pass printable size to which the print plan size is changed by the changing function is a maximum size printable by the printing device in the one pass.

3. The non-transitory computer-readable storage medium according to claim 1, wherein
   the printing program further causes the computer to realize
   a determining function for determining whether the print plan size designated by the user is the one-pass printable size.

4. The non-transitory computer-readable storage medium according to claim 3, wherein
   the printing program further causes the computer to realize a limitation receiving function for receiving, from a user, a limitation instruction for instructing whether to limit the print plan size to the one-pass printable size, and
   the designating function changes a range of the print plan size that the user can designate according to the limitation instruction.

5. The non-transitory computer-readable storage medium according to claim 4, wherein, in a state in which the print plan size exceeds the one-pass printable size, in response to the limitation receiving function receiving the limitation instruction for limiting the print plan size to the one-pass printable size, the changing function changes the print plan size to the one-pass printable size.

6. The non-transitory computer-readable storage medium according to claim 1, wherein the printing program further causes the computer to realize an acquiring function for acquiring image data for the printing device to print the print image, and the instructing function generates reduced image data obtained by reducing the image data to enable the printing device to print the print image in the one pass and transmits the generated reduced image data to perform the one-pass printing instruction.

7. The non-transitory computer-readable storage medium according to claim 1, wherein the printing program further causes the computer to realize an acquiring function for acquiring image data for the printing device to print the print image, and the instructing function generates rotated image data obtained by rotating the image data to enable the printing device to print the print image in the one pass and transmits the generated rotated image data to perform the one-pass printing instruction.

8. The non-transitory computer-readable storage medium according to claim 1, wherein the designating function prompts the user to input a numerical value to a numerical value input field to designate the print plan size.

9. The non-transitory computer-readable storage medium according to claim 1, wherein the change instructing function prompts the user to operate a checkbox or a button to input the change instruction.

10. A non-transitory computer-readable storage medium storing a printing program for causing a computer to realize:

a limitation receiving function for receiving, from a user, a limitation instruction for instructing whether to limit a print plan size of a print image to a one-pass printable size, which is a size printable in one pass by a printing device that is manually moved with respect to a medium to perform printing on the medium;

a designating function for prompting the user to designate the print plan size within a range according to the limitation instruction; and an instructing function for instructing the printing device to print the print image in the print plan size designated by the designating function.

11. A non-transitory computer-readable storage medium storing a printing program for causing a computer to realize:

an acquiring function for acquiring image data to print a print image by a printing device that is manually moved with respect to a medium to perform printing on the medium;

a changing function for, when a print plan size is not a one-pass printable size, changing the print plan size to the one-pass printable size by generating rotated image data obtained by rotating the image data, the one-pass printable size being a size printable in one pass by the printing device; and an instructing function for performing a one-pass printing instruction for instructing the printing device to print the print image in the print plan size.

* * * * *